United States Patent [19]

Liberti et al.

[11] Patent Number: 4,556,681
[45] Date of Patent: Dec. 3, 1985

[54] POLYCARBONATE RESIN FOAM

[75] Inventors: Frank N. Liberti, Mt. Vernon, Ind.; Gerald F. Macke, Wichita, Kans.

[73] Assignee: General Electric Company, Pittsfield, Mass.

[21] Appl. No.: 688,371

[22] Filed: Jan. 2, 1985

[51] Int. Cl.$^4$ .............................. C08J 9/10; C08J 9/14
[52] U.S. Cl. ........................................ 521/90; 521/79; 521/135; 521/180; 524/109; 524/114
[58] Field of Search ............. 521/180, 135, 90; 524/109, 114

[56] References Cited

U.S. PATENT DOCUMENTS

| | | | |
|---|---|---|---|
| 3,277,029 | 10/1966 | Chadwick et al. | 521/180 |
| 3,290,261 | 12/1966 | Goldblum | 521/180 |
| 3,442,829 | 5/1969 | Moore | 521/180 |
| 3,489,716 | 1/1970 | Calkins | 524/114 |
| 3,634,312 | 1/1972 | Babillis et al. | 524/109 |
| 3,819,545 | 6/1974 | Hunter | 521/180 |
| 3,839,247 | 10/1974 | Bialous et al. | 524/114 |
| 3,903,224 | 12/1975 | Billiu | 521/180 |
| 4,065,401 | 12/1977 | Cohnen et al. | 521/180 |
| 4,097,425 | 6/1978 | Niznik | 521/180 |

*Primary Examiner*—Morton Foelak
*Attorney, Agent, or Firm*—John W. Harbour; William F. Mufatti; Edward K. Welch, II

[57] ABSTRACT

Epoxy compounds are added to polycarbonate resin to reduce or eliminate the necessity of drying the resin prior to a foaming process.

6 Claims, No Drawings

POLYCARBONATE RESIN FOAM

This invention relates to a method for producing foamed polycarbonate articles and to foamable polycarbonate resins suitable therefor. More particularly, this invention relates to a method for producing foamed polycarbonate articles which method eliminates or reduces the necessity for drying the polycarbonate resin before the foaming and shaping step.

BACKGROUND

Foamed thermoplastic resins are finding increasing utility in the manufacture of a wide range of articles. Polycarbonate thermoplastic resins are suitable for foaming and may be used to produce foamed articles with the excellent physical properties generally associated with this thermoplastic resin. However, foamed articles are often very large in comparison to many injection molded or extruded articles and generally utilize methods of manufacture with extremely short cycle times and high throughput rates. In the case of polycarbonate, which is moisture sensitive at processing temperatures, the high throughput rates place a load on drying equipment which for many molders and extruders of thermoplastic resins is beyond the capacity of their equipment. Insufficient drying of the polycarbonate resin before melt processing results in hydrolysis of the resin and lower average molecular weights. Foamed articles produced from insufficiently dried polycarbonate resin exhibit reduced tensile strength, flexural strength, flexural modulus, deflection temperature, and falling ball impact strength.

Polycarbonate resins containing epoxy compounds as stabilizers are well known. U.S. Pat. No. 3,489,716, Calkins, et al., assigned to the same assignee as the present invention discloses a cycloaliphatic epoxy containing 1-2 cycloaliphatic rings in a polycarbonate resin as a heat and color stabilizer. These epoxies of Calkins, et al., have been used in the past by the assignee of the present invention in foam grade polycarbonate blends for commercial sale, but in amounts of 0.1% by weight of the blend and less.

U.S. Pat. No. 3,634,312, Babillis, et al., assigned to the same assignee as the present invention discloses the use of epoxy compounds as thermal stabilizers for copolycarbonate/phosphite compositions. U.S. Pat No. 3,839,247, Bialous, et al., assigned to the same assignee as the present invention, discloses aromatic epoxies, aliphatic epoxies, or mixtures thereof in combination with polycarbonate resin to prevent hazing and brittleness in the resin when subsequently subjected to elevated temperatures and moisture.

Therefore, it is an object of the present invention to produce foamed polycarbonate materials from undried resin having improved physical properties, particularly Izod impact strength.

It is yet another object of the present invention to produce foamable grades of polycarbonate resin which require little or no drying before foaming.

It is yet another object of the present invention to reduce or eliminate the necessity of drying polycarbonate resins before foaming.

DETAILED DESCRIPTION OF THE INVENTION

Briefly, according to the present invention, foamed polycarbonate articles may be made by a method which includes the step of foaming a polycarbonate resin composition containing from about 0.2% to about 1.0% by weight an aromatic, aliphatic, or cycloaliphatic epoxy compound. The presence of such epoxy compound allows for the elimination or reduction in severity of a heretofore necessary drying step.

Any of the usual polycarbonate resins are suitable for use in the polycarbonate resin composition mentioned herein. These resins include but are not limited to those described in U.S. Pat. Nos. 3,161,615; 3,220,973; 3,312,659; 3,312,660; 3,313,777; 3,666,614; among others all of which are incorporated herein by reference. Preferred polycarbonate resins are the aromatic polycarbonate resins of the dihydric phenols, particularly those of bisphenol-A. A preferred BPA-polycarbonate is referred to commercially as LEXAN® polycarbonate resin, a trademark of the General Electric Company.

Other thermoplastic resins may be blended with polycarbonate resin to form the polycarbonate resin composition. These thermoplastic materials which may also be present include acrylic and methacrylic polymers, polyethermides, phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and necessary compatibilizers.

Epoxy functionalized materials suitable for use in the polycarbonate resin composition are aliphatic, cycloaliphatic and aromatic epoxy functionalized materials or mixtures thereof. Of the aromatic epoxies that are employed, they can be either the aromatic glycidyl ether or the aromatic glycidyl ethers containing 1 to 3 rings or they may be polyepoxides, i.e., aromatic polyglycidyl ethers containing 1 to 3 aromatic rings. Of the aliphatic epoxies, they may be best represented by the following formula:

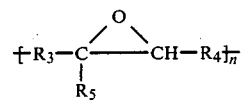

wherein $R_5$ is hydrogen or methyl and $R_3$ and $R_4$ are independently selected from hydrogen or alkyl radicals of 1 to 24 carbon atoms and n is an integer of from 1 to about 10. Of the cycloaliphatic epoxies, they can be either the cycloaliphatic-aliphatic glycidyl ethers or esters, or cycloaliphatic epoxies made by the epoxidation of cycloolefins with peracetic acid. Preferably, the cycloaliphatic epoxies contain 1-2 cycloaliphatic rings.

Specifically, the epoxies that can be employed herein are glycidol, bisphenol-A diglycidyl ether, tetrabromobisphenol-A diglycidyl ether, diglycidyl ester of phthalic acid, diglycidyl ester of hexahydrophthalic acid, epoxidized soybean oil, butadiene diepoxide, tetraphenylethylene epoxide, octyl epoxy tallate, dicyclopentadiene dioxide, vinylcyclohexene dioxide, bis (3,4-epoxy-6-methylcyclohexylmethyl) adipate, and 3,4-epoxycyclohexylmethyl-3,4-epoxycyclohexane carboxylate. Preferably, the epoxy compound employed in the practice of this invention is bisphenol-A diglycidyl ether.

Suitable epoxy functionalized materials are available from Dow Chemical Company under the tradename DER-332, from Shell Oil Corporation under the tradenames Epon 826, 828, and 871 and from Ciba-Giegy Corporation under the tradenames CY-182 and CY-183.

The epoxy functionalized materials are added to the polycarbonate resin composition in amounts effective to retain the Izod impact strength of the polycarbonate resin foam in spite of an otherwise insufficient drying step prior to the foaming step. A person skilled in the art may determine the optimum amount for any given epoxy functionalized material. Generally, the epoxy functionalized material should be added to the polycarbonate resin composition in a percent by weight ranging from about 0.2% to about 1.0% of the total polycarbonate resin composition. Preferably, the percent by weight is from about 0.3% to about 0.7% epoxy functionalized material.

Preferred polycarbonate resin compositions contain a reinforcing filler or agent. In general, any reinforcing filler can be used including metals, e.g., aluminum, iron, or nickel and the like and non-metals, e.g., carbon filaments, silicates, such as acicular calcium silicate, asbestos, $TiO_2$, potassium titanate and titanate whiskers, wollastonite, glass flakes and fibers and the like. It is to be understood that unless the filler adds to the strength and stiffness of the composition, it is only a filler and not a reinforcing filler as contemplated herein. In particular, the reinforcing fillers increase the flexural strength, the flexural modulus, the tensile strength, and the heat distortion temperature. Although it is only necessary to have at least a reinforcing amount of the reinforcing filler present, in general, the reinforcing filler may be added to the polycarbonate resin composition in a ratio to the total thermoplastic resin present of from about 1/99 to about 9/1.

In particular, the preferred reinforcing fillers are of glass, and it is preferred to use fibrous glass filaments comprised of lime-aluminum borosilicate glass that is relatively soda free. This is know as "E" glass. However, other glasses are useful where electrical properties are not so important, e.g., the low soda glass known as "C" glass. The filaments are made by standard processes; e.g., by stream or air blowing, flame blowing, and mechanical pulling. The preferred filaments for plastics reinforcement are made by mechanical pulling. The filament diameters range from about 0.000112 to 0.00075 inch, but this is not critical to the present invention.

The length of the glass filaments and whether or not they are bundled into fibers and the fibers bundled in turn to yarns, ropes, or rovings, or woven into mats and the like are also not critical to the invention. In preparing the present compositions, it is convenient to use the filamentous glass in the form of chopped strands of from about ⅛ inch to about 1 inch long, preferably less than ¼ inch long. However, even shorter lengths will be encountered because during compounding, considerable fragmentation will occur.

In general, best properties will be obtained if the sized filamentous glass reinforcement is added to the polycarbonate resin composition in a weight ratio to the total thermoplastic resin present of from about 1/99 to about ⅝ . For direct molding or extruding use, it will be readily apparent to one skilled in the art at what composition the glass will cause flow problems. However, it is useful also to prepare polycarbonate resin compositions containing substantially greater quantities of glass and custom blending with resins that are not glass reinforced to provide any desired glass content of a lower value.

The polycarbonate resin compositions of the present invention may contain flame retardant additives. Useful flame retardant additives comprise a family of chemical compounds well known to those skilled in the art. Generally speaking, the more important of these compounds contain chemical elements employed for their ability to impart flame resistance, e.g., bromine, chlorine, antimony, and nitrogen. It is preferred that the flame-retardant additive comprise a halogenated organic compound (brominated or chlorinated); a halogen-containing organic compound in admixture with antimony oxide, elemental phosphorus compounds; a halogen-containing compound in admixture with a phosphorus compound or compounds containing phosphorus-nitrogen bonds.

Among the preferred halogen-containing compounds are the diaromatics of which the following are representative:

2,2-bis(3,5-dichlorophenyl) propane
bis-(2,chlorophenyl) methane
bis-(2,6-dibromophenyl) methane
1,1-bis(4-iodophenyl) ethane
1,2-bis-(2,6-dichlorophenyl)ethane
1,1-bis(2-chloro-4-iodophenyl) ethane
1,1-bis(2-chloro-4-methylphenyl) ethane
1,1-bis-(3,5-dichlorophenyl)ethane
2,2-bis-(3-phenyl-4-bromophenyl) ethane
2,3-bis-(4,6-dichloronaphthyl)-ethane
2,2-bis-(2,6-dichlorophenyl) pentane
2,2-bis-(3,5-dichlorophenyl) hexane
bis-(4-chlorophenyl) phenylmethane
bis-(3,5-dichlorophenyl) cyclohexylmethane
bis-(3-nitro-4-bromophenyl) methane
bis-(4-hydroxy-2,6-dichloro-3-methoxyphenyl) methane
2,2-bis-(3,5-dichloro-4-hydroxyphenyl) propane
2,2-bis-(3-bromo-4-hyroxyphenyl) propane
2,2-bis-(3,5-dibromo-4-hydroxyphenyl) propane Also preferred are the substituted benzenes exemplified by tetrabromobenzene, hexachlorobenzene, hexabromobenzene, and the biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The amount of the flame retardant additive used is not critical to the invention, so long as it is present in a minor proportion based on the total resin content of the polycarbonate resin composition—major proportions will detract from physical properties—but at least sufficient to render the polycarbonate resin composition non-burning or self-extinguishing. Those skilled in the art are well aware that the amount will vary with the nature of the polymers in the blend and with the efficiency of the additive.

The polycarbonate resin composition may additionally contain a phosphorus containing compound as a color stabilizer. Generally, phosphites are used for this purpose at a weight percent in the total polycarbonate resin composition of about 0.05%. Commonly, an epoxy functional material is added along with the phosphorus containing compound as a secondary stabilizer to scavenge the phosphorus containing compound by-products.

The polycarbonate resin composition may also contain other active or inactive fillers and additives including carbon black; chalk; antioxidants; stabilizers, such as salts of lead, cadmium, calcium, zinc, tin, or barium, waxes; dyes; pigments; impact modifiers; zinc oxides; etc.

The above polycarbonate resin composition may be expanded from a granular or bead form to assume a porous cellular, solidified structure by the action of various propellants or agents for expanding or blowing the materials. The blowing agents, in accordance with common practice, are usually gases, gas generating solids, or highly fugacious liquids which have been dissolved or otherwise intimately incorporated within the thermoplastic resinous material either at the extrusion or die head while the resinous material is in melt form or while the resinous material is in unexpanded granular form. Thus, the polycarbonate resin composition may not come into contact with a blowing agent until just prior to the instant of foaming.

The blowing agents suitable for use in or with the polycarbonate resin composition include gases which expand upon the release of pressure to foam the resin composition, liquids which will vaporize to a gas and expand the resin upon the release of pressure, solids which decompose to release a gas, and combinations of such gases, liquids, and solids. Examples of suitable normally gaseous agents which can be used are paraffins such as propane or butane and more permanent gases such as nitrogen, carbon dioxide, and air. Similarly, olefins such as ethylene, propylene, butylene, etc., and mixtures thereof can be used to advantage. Suitable normally liquid blowing agents include methyl chloride, higher paraffins such as pentane or hexane, freons, etc. Examples of suitable solids which upon decomposition release a gas are ammonium or azo type compounds, such as ammonium carbonate, ammonium bicarbonate, potassium bicarbonate, diazoaminobenzene, diazoaminotoluene, azodicarbonamide, diazoisobutyronitrile, etc. The amount of foaming agent used depends upon the volume of gas it will generate and the foam density required.

The foaming agent may be combined with the polycarbonate resin composition either prior to or at the instant of the actual foaming of the resin in an amount sufficient to result in the desired degree of foaming. Preferably, the foaming agent is premixed with the polycarbonate resin composition while in granular or particulate form and activated by the application of heat to the resin particles.

The polycarbonate resin composition may be foamed by any of the common techniques in either an injection molding or extrusion operation. Generally, such techniques involve heating the polycarbonate resin composition until it is in melt form and injecting the melt into a die cavity or extruding the melt through a die head with an activated blowing agent. One skilled in such techniques can easily prescribe more specific methods and conditions for foaming the polycarbonate resin composition.

Due to the presence of the epoxy functionalized material, the need for drying the polycarbonate resin composition prior to foaming is reduced or eliminated. It is normally required that the water content of polycarbonate resin containing compositions be reduced to about 0.02% by weight or less before foaming to avoid drastic reduction of Izod impact strength. Preferably, the water content is reduced to as low as possible. Under the present invention, the epoxy functionalized materials improve the Izod impact strength of foamed, water containing polycarbonate resins. In some cases, this may eliminate the need for drying the resin altogether. In any case, the adverse effects of otherwise insufficient drying will be reduced or eliminated.

PREFERRED EMBODIMENT OF THE INVENTION

Thus has been described a method for foaming polycarbonate resin containing compositions wherein the need for drying the polycarbonate resin composition is reduced or eliminated. In order to more fully and clearly illustrate the invention, the following specific examples are presented. It is intended that the examples be considered as illustrative of rather than limiting to the invention disclosed and claimed herein.

EXAMPLE 1

Polycarbonate resin was dry blended with 5% by weight glass fibers, stabilizers, and various amounts of epoxy functionalized materials. The resin compositions were extruded and comminuted into pellets having an equilibrium water content established through conditioning for 150 hours at room temperature and various relative humidities. The water content of the pellets was found to be roughly linear as a function of relative humidity between (0,0) and (100, 0.35 wt %). To each 100 parts by weight polycarbonate resin pellets was dry blended 0.1% by weight 5-phenyl tetrazole, a blowing agent to form a pellet powder mix for injection molding. The wet pellet powder mixes were thereafter foam injection molded without a drying step into test bars to determine unnotched Izod Impact Strength (ASTM D256).

EXAMPLE 2

Example 1 was followed wherein the amounts shown below of DER-332, a bisphenol-A diglycidyl ether made by Dow Chemical Company, were used as the epoxy functionalized material and the resin pellets were conditioned at 92% RH.

| 92% Relative Humidity | |
|---|---|
| Polycarbonate Resin Composition Weight % Epoxy | Unnotched Izod Impact Strength ft. lbs./in. |
| 0 | 1.9 |
| 0.2 | 2.6 |
| 0.5 | 3.2 |
| 1.0 | 1.9 |
| 2.0 | 1.9 |
| 5.0 | 1.5 |

EXAMPLE 3

Example 1 was followed wherein the amounts shown below of DER-332 were used as the epoxy functionalized material and the resin pellets were conditioned at 69.2% RH.

| 69.2% Relative Humidity | |
|---|---|
| Polycarbonate Resin Composition Weight % Epoxy | Unnotched Izod Impact Strength ft. lbs./in. |
| 0 | 1.2 |
| 0.3 | 1.5 |
| 0.4 | 2.4 |
| 0.5 | 1.7 |
| 0.6 | 2.5 |
| 0.7 | 2.2 |

EXAMPLE 4

Example 1 was followed wherein the amounts shown below of DER-332 were used as the epoxy functionalized material and the resin pellets were conditioned at 58% RH.

| 58% Relative Humidity | |
|---|---|
| Polycarbonate Resin Composition Weight % Epoxy | Unnotched Izod Impact Strength ft. lbs./in. |
| 0 | 3.9 |
| 0.3 | 5.4 |
| 0.5 | 5.9 |
| 0.7 | 3.5 |

What is claimed is:

1. A method for producing a foamed polycarbonate article comprising a step of heating and foaming a polycarbonate resin composition comprising a polycarbonate resin, a blowing agent, and an impact enhancing amount of from about 0.2% to about 1.0% by weight of resin content of an epoxy compound provided that the resin composition contains greater than about 0.02% by weight water.

2. The method of claim 1 wherein said epoxy functionalized material is an aromatic epoxy compound.

3. The method of claim 1 wherein said epoxy functionalized material is an aliphatic epoxy compound.

4. The method of claim 1 wherein said epoxy functionalized material is a cycloaliphatic epoxy compound.

5. The method of claim 1 wherein said polycarbonate resin composition contains reinforcing filler.

6. A method for producing a foamed polycarbonate article consisting essentially of heating and a step of foaming a polycarbonate resin composition comprising a polycarbonate resin, a blowing agent, and an impact enhancing amount of from about 0.2% to about 1.0% by weight of resin content an epoxy functionalized material, provided that the resin composition contains greater than about 0.02% by weight water.

* * * * *